Patented June 24, 1930

1,766,428

UNITED STATES PATENT OFFICE

DONATO COZZOLINO, OF LOS ANGELES, CALIFORNIA

PROCESS OF STABILIZING CEREAL BEVERAGES

No Drawing.   Application filed July 16, 1927. Serial No. 206,389.

My invention relates to a process of treating cereal beverages and particularly, although not necessarily, temperance beverages containing less than 0.5% by volume of alcohol, commonly called "near beer."

Numerous attempts have been made to stabilize the beverage by removing therefrom nitrogenous substances known in the brewer's art as undesirable albuminoids, which do not interfere with the clarity of the beverage when it is kept at ordinary temperatures, but which do render the beverage turbid when chilled to a low temperature following Pasteurization or before serving. Lactic acid, pepsin, and tannin and sulphurous acid have been employed but only with partial success. The tannin and sulphurous acid process is unsatisfactory, first, because the sulphurous acid prevents the tannin from acting by holding the albuminoids in solution at ordinary temperatures only, and second because the sulphurous acid lends to the beverage a sulphurous odor which is objectionable. Beverages treated by any of the previous processes are not wholly clear, and as a consequence these processes are being abandoned.

It is a purpose of my invention to provide a process of treating cereal beverages by which the removal of the undersirable albuminoids therefrom is effected with such a degree of thoroughness as to positively prevent turbidity under varying temperatures and particularly when chilled and to in nowise affect the flavor or color of the beverage.

These results are obtained through the use of a solution of tannic acid in which a suitable siliceous clay, such as kaolin, Spanish earth, infusorial earth, or kieselguhr is diluted and the whole mixture with the cereal beverage to be treated. The action of tannin on gelatinous bodies is well known, but when used alone it does not reach the nitrogenous substances or undesirable albuminoids contained in the cereal beverages. However, with the addition to the tannin of a siliceous clay, I find that the lactic, carbonic, succinic, and other acids contained in the beverage act on the siliceous clay so that the latter releases the albuminoids from solution whereby they are free to adhere to the minute particles of clay forming countless and infinitesimal spheres of albuminous hydrate of silica. This fact can be verified by adding a small amount of kaolin to the beverage, and upon collecting the resultant precipitate its analysis reveals a gelatinous compound which, when treated with tannin, curdles rapidly.

In the practice of my process I proceed as follows.

After violent fermentation or dealcoholization of the cereal beverage, I introduce into the mass a stabilizing solution of from one to three parts of tannin and from two to six parts of siliceous clay into each fifty thousand parts of cereal beverage. The whole is mixed by stirring until the solution is evenly distributed throughout the liquid when the beverage is allowed to rest for a period of about five days, which is sufficient to permit adherence of the albuminoids to the clay particles so that the resultant precipitate can be removed by filtering. Thus the undesirable albuminoids are completely removed and the beverage rendered immune to turbidity at any temperature and particularly when chilled, as well as any change in color or taste even when subjected to the subsequent brewing operations.

Although I have herein described only one process of stabilizing cereal beverages, it is to be understood that various changes and modifications may be made herein without departing from the spirit of the invention and the spirit and scope of the appended claims.

I claim:

1. A process of stabilizing cereal beverages containing less than 0.5% by volume of alcohol, which consists in treating the beverage at any stage of the brewing process with tannin and a siliceous clay to precipitate the undesirable albuminoids which render the finished beverage turbid when chilled and produce a change in color and taste when pasturized and removing the precipitate.

2. A process of stabilizing cereal beverages containing less than 0.5% by volume of alcohol, which consists in treating the beverage with from one to three parts of tannin and from two to six parts of siliceous clay to each fifty thousand parts of the beverage to precipitate the undesirable albuminoids which render the beverage turbid when chilled and produce a change of color and taste when pasteurized, and removing the precipitate.

DONATO COZZOLINO.